US 12,089,612 B2

(12) United States Patent
Kadyk et al.

(10) Patent No.: US 12,089,612 B2
(45) Date of Patent: Sep. 17, 2024

(54) HEATING SYSTEM FOR COLD DRINK APPARATUS AND METHODS OF USE

(71) Applicant: BUNN-O-MATIC CORPORATION, Springfield, IL (US)

(72) Inventors: Jeffery W. Kadyk, Springfield, IL (US); Joel Morton, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 17/957,369

(22) Filed: Sep. 30, 2022

(65) Prior Publication Data

US 2023/0107530 A1 Apr. 6, 2023

Related U.S. Application Data

(60) Provisional application No. 63/250,838, filed on Sep. 30, 2021.

(51) Int. Cl.
*A23G 9/04* (2006.01)
*A23G 9/12* (2006.01)
(Continued)

(52) U.S. Cl.
CPC ............... *A23G 9/045* (2013.01); *A23G 9/12* (2013.01); *A23G 9/18* (2013.01); *A23G 9/228* (2013.01)

(58) Field of Classification Search
CPC . A23G 9/045; A23G 9/12; A23G 9/18; A23G 9/228; A23G 9/04; A23G 9/086;
(Continued)

(56) References Cited

U.S. PATENT DOCUMENTS 3,648,477 A 3/1972 Shartle
3,898,860 A 8/1975 Shepherd et al.
(Continued)

FOREIGN PATENT DOCUMENTS

CN 208458364 U 2/2019
CN 208925146 U 6/2019
(Continued)

OTHER PUBLICATIONS

Extended EP Search Report issued in EP22199089.8 (Feb. 20, 2023.
Office Action issued in Appl. No. CA 3,176,684 (Feb. 2, 2024).

*Primary Examiner* — Miguel A Diaz
(74) *Attorney, Agent, or Firm* — Barnes & Thornburg LLP

(57) ABSTRACT

A cold drink apparatus, system, and method of operation for producing a chilled or partially frozen beverage product, often referred to as a slush beverage or "granita" beverage. The apparatus includes a chilling structure and some form of blade or auger that moves relative to the chilling structure to strip product off and circulate the beverage along the chilling structure. The apparatus further includes a heating structure and heating operation to heat to at least partially thaw the product so that it returns to a generally liquid or solution state. Such heating operation reduces downtime for permitting for machine maintenance and/or permitting the sugar or solution within the product to be redistributed and refrozen to maintain desired qualities and consistency of the product.

21 Claims, 13 Drawing Sheets

(51) Int. Cl.
*A23G 9/18* (2006.01)
*A23G 9/22* (2006.01)

(58) Field of Classification Search
CPC .......... A23G 9/10; A23G 9/103; A23G 9/106; A23G 9/16; A23G 9/222; A23G 9/224
See application file for complete search history.

(56) References Cited

U.S. PATENT DOCUMENTS

| | | | |
|---|---|---|---|
| 5,095,710 A | | 3/1992 | Black et al. |
| 5,103,649 A | | 4/1992 | Kieffer |
| 5,201,861 A | * | 4/1993 | Menzel .................. A23G 9/045 62/135 |
| 5,212,954 A | | 5/1993 | Black et al. |
| 5,402,644 A | | 4/1995 | Faries, Jr. et al. |
| 5,967,226 A | | 10/1999 | Choi |
| 6,058,721 A | | 5/2000 | Midden et al. |
| 6,149,035 A | * | 11/2000 | Gorski .................. G07F 13/065 222/64 |
| 6,286,724 B1 | * | 9/2001 | Midden ................ B67D 1/0848 222/1 |
| 6,430,952 B1 | | 8/2002 | Midden et al. |
| 6,513,578 B2 | | 2/2003 | Frank |
| 6,619,056 B2 | | 9/2003 | Midden et al. |
| 6,679,314 B2 | | 1/2004 | Frank |
| 7,669,519 B2 | | 3/2010 | Pope et al. |
| 7,712,321 B2 | | 5/2010 | Kadyk |
| 10,285,417 B2 | * | 5/2019 | Cocchi ..................... A23G 9/28 |
| 10,307,012 B2 | | 6/2019 | Hart et al. |
| 10,674,744 B2 | | 6/2020 | Cocchi et al. |
| 10,712,094 B2 | * | 7/2020 | Cocchi ..................... A23G 9/22 |
| 2002/0189269 A1 | * | 12/2002 | Midden .................. A23G 9/045 62/342 |
| 2007/0017234 A1 | | 1/2007 | Moulder et al. |
| 2008/0202130 A1 | * | 8/2008 | Kadyk ..................... A23G 9/12 62/158 |
| 2012/0055189 A1 | * | 3/2012 | Sipp ....................... A23G 9/045 222/240 |
| 2018/0098554 A1 | * | 4/2018 | Cocchi .................. A23G 9/222 |
| 2018/0228180 A1 | * | 8/2018 | Cocchi ..................... A23G 9/12 |
| 2018/0231318 A1 | | 8/2018 | Cocchi et al. |

FOREIGN PATENT DOCUMENTS

| | | |
|---|---|---|
| EP | 3305089 | 4/2018 |
| EP | 3305090 | 4/2018 |
| EP | 3434112 | 1/2019 |
| WO | WO 2018/020449 | 2/2018 |

* cited by examiner

HEATING SYSTEM FOR COLD DRINK APPARATUS AND METHODS OF USE

CROSS REFERENCE AND PRIORITY CLAIM

This application claims priority to U.S. Provisional Patent Application Ser. No. 63/250,838, filed on Sep. 30, 2021, titled "Heating System for Cold Drink Apparatus and Methods of Use" the entirety of which is incorporated by reference.

FIELD OF THE DISCLOSURE

The present invention relates to an apparatus, system, and method for producing a chilled or at least partially frozen beverage product, often referred to as a slush beverage or "granita", and more particularly to a system and method for providing heat to such an apparatus to controllably raise the temperature of the chilled or partially frozen beverage product to produce a thawed condition and then controllably rechilling the beverage product.

BACKGROUND OF THE DISCLOSURE

A variety of apparatuses have been designed to produce chilled beverages as well as to produce beverages which are in a "slush" form. Some of these apparatuses are referred to as "granita" machines. Generally, the term cold drink apparatus will be used herein to refer to the slush, granita, or similar apparatus that reduces the temperature of a beverage product to a condition where the product is generally fluid but a portion of which is at least partially frozen in the overall fluid mixture. Such apparatuses can be used to produce slush beverages from a variety of products including fruit juices, coffee-based beverages, tea-based beverages, as well as beverages containing alcohol. Such apparatuses include a chilling portion, and some form of blade or auger that moves relative to the chilling portion to strip the frozen product off and circulate the beverage along the chilling portion. Circulation of the beverage along the chilling portion helps to reduce the temperature of the beverage mixture thereby approaching a slush consistency. An example of such an apparatus is described and illustrated in U.S. Pat. No. 6,430,952, which issued on Aug. 13, 2002, and is incorporated by reference in its entirety herein.

Slush beverages or granita have a consistency that is achieved by controlling a combination of the temperature of the liquid and the solids/syrup content in the liquid. For example, the solids/syrups content may be in the form of coffee solids, as well as sugar or fruit syrup solids. Such apparatuses typically use torque to sense the consistency of the slush mix as it approaches a freezing point. The torque is sensed by twisting of the motor itself and pivoting, thereby tripping a switch coupled thereto. The switch deactivates the cooling system.

Maintaining the desired consistency of the ice crystals of granita beverages is important to maintaining the quality of such beverages. For instance, if the ice crystals are maintained in a frozen state for too long, the sugar in the crystals may begin to disproportionately migrate to the outside of the crystal, leaving portions of the ice crystal with less or no sugar or syrup and causing the consistency of the ice crystal to be lessened. Accordingly, the granita beverage may ideally be at least partially thawed or fully thawed from time to time to permit the sugar or syrup to redistributed within the beverage in a liquid format, and the liquid subsequently refrozen in the granite apparatus to form new ice crystals with more consistency of the sugar/syrup. Such thawing and refreezing process can permit the quality of the granita beverage to be maintained over a longer duration of time.

Adjustment of the consistency of the slush is also a concern. In other words, if an operator wishes to increase or decrease thickness of the consistency of the slush ice crystals, the apparatus must either increase its chilling effect or reduce its chilling effect. In various systems, such adjustment may be made by adjusting a screw and spring arrangement associated with the rotation of the motor. But the spring is difficult to adjust and is typically located within the housing of the apparatus. Such adjustment is inconvenient and very cumbersome to accurately monitor while operating the apparatus. Accordingly, there is a need for alternative methods of adjusting the temperature changing effect of such apparatuses.

In addition, typical granita devices require a significant amount of time devoted to set up, cycling of product, and maintenance of the equipment to provide for optimal quality of product produced. For example, as mentioned, in order to provide for optimal quality, the granita product may be required to be thawed and refrozen on a regular or consistent basis, thereby making the time it takes to produce quality product a reoccurring concern. Moreover, at the beginning of an operating day after an extended period of non-use, the apparatus must be started up and the solution refrozen. Alternatively, the mixture may be maintained in its frozen state, with the quality of the product being diminished if it remains in such a state for too long. Typically, the machine is turned off and the chilling process must be started anew at the beginning of each day, which can cause undesired downtime.

SUMMARY

It is desirable to provide an apparatus that permits for efficient and limited downtime when the frozen product cannot be dispensed. Accordingly, an apparatus illustratively includes a heating structure to heat or thaw the frozen product so that it returns to a liquid or solution state in a manner that is quicker than simply allowing the product to thaw in the ambient air. Such heating operation reduces downtime for permitting for machine maintenance and/or permitting the sugar or solution within the ice crystals to be redistributed and refrozen to maintain desired qualities and consistency of the frozen product.

BRIEF DESCRIPTION OF THE DRAWINGS

The organization and manner of the structure and function of the invention, together with the further objects and advantages thereof, may be understood by reference to the following description taken in connection with the accompanying drawings, wherein like reference numerals identify like elements, and in which.

DESCRIPTION

Figure 1:
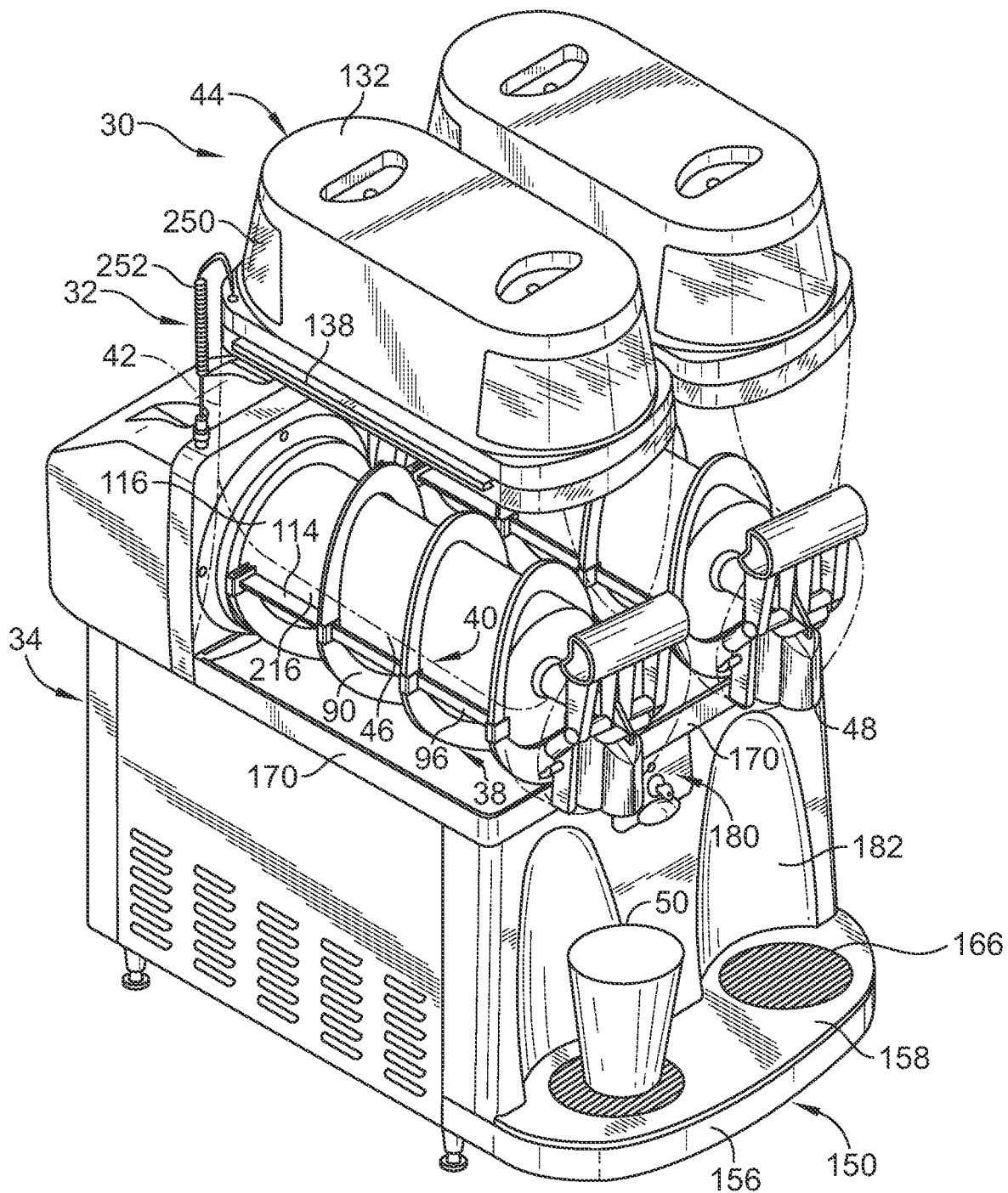
FIG. 1 is a top, front, left-hand perspective view of a cold drink apparatus of the present invention.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 2:
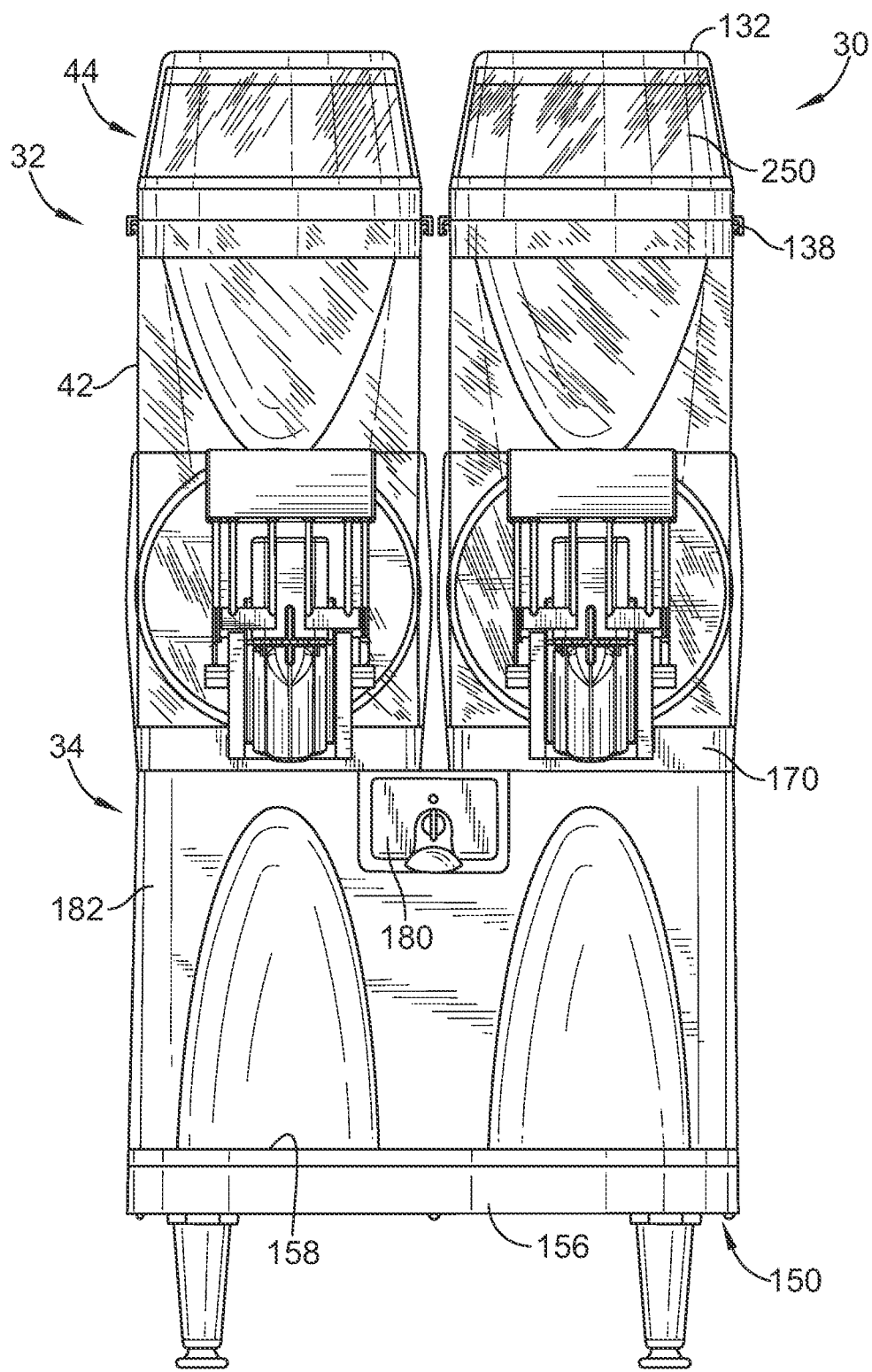
FIG. 2 is a front elevational view of the apparatus as shown in FIG. 1.
Figure 3:
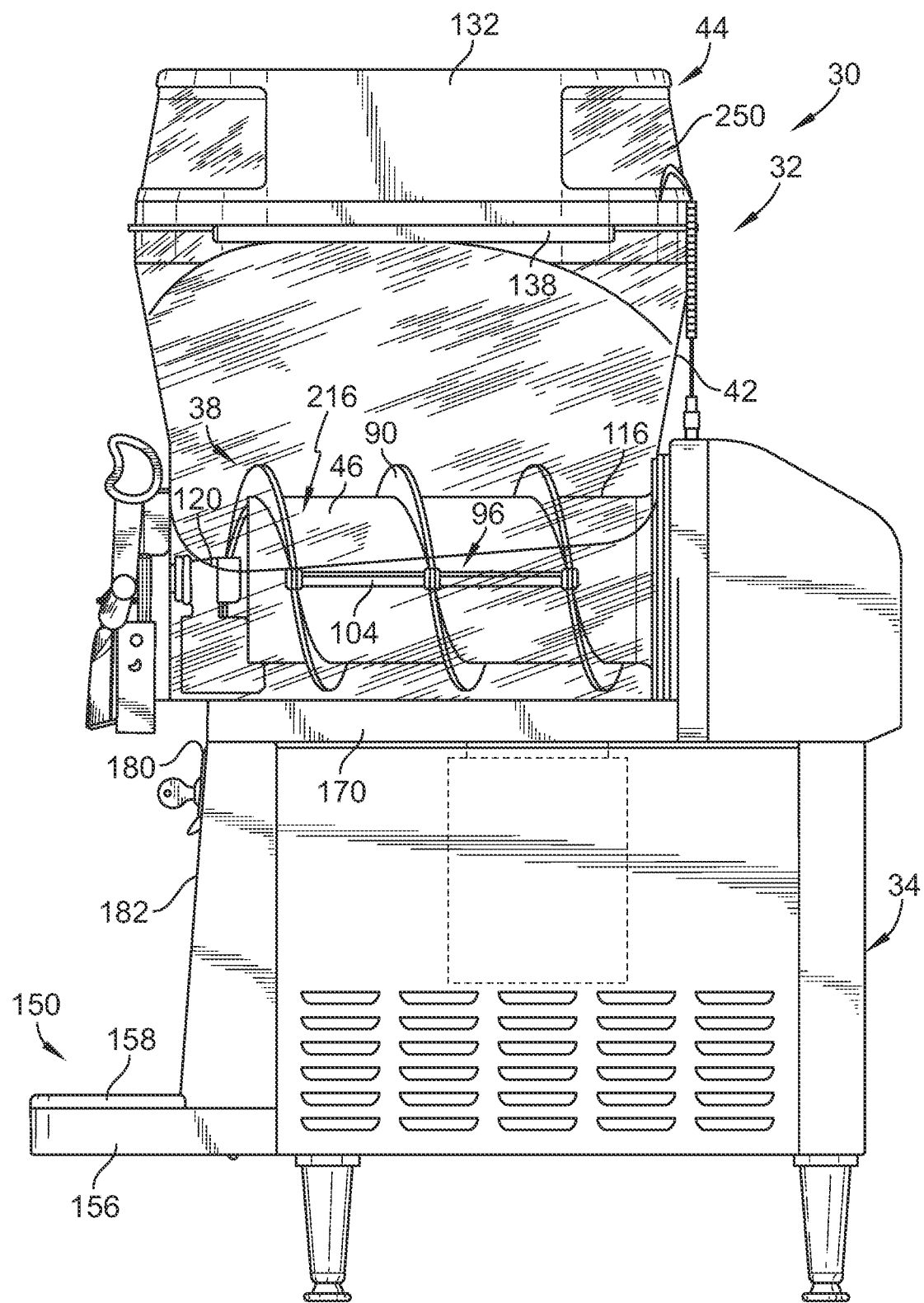
FIG. 3 is a right-side, elevational view of the apparatus as shown in FIGS. 1 and 2.

With reference to the figures, a chilled or slush beverage apparatus, or cold drink system 30 for controlling the viscosity and/or temperature of a beverage product mixture is shown in perspective in FIG. 1. The beverage apparatus 30 includes at least one hopper assembly 32, having at least one wall defining an interior volume for retaining a quantity of beverage product. The hopper is retained on a housing 34. As will be described in greater detail hereinbelow, the housing 34 includes a mixing assembly and a temperature control system 200 (see FIG. 9). The mixing assembly includes an auger drive motor 36 and a mixer of auger assembly 38. The auger drive motor 36 as mentioned above drives the auger assembly 38, which is positioned proximate to a temperature or heating and chilling assembly 40, both of which are generally retained within a corresponding hopper assembly 32. It should be noted that while a two-hopper apparatus is shown in FIG. 2, it may be desirable to provide a single hopper as well as three or more hoppers.

As an exemplary initial matter, an illustrative embodiment of the present system includes generally redundant left and right hopper assemblies. As such, reference to each assembly will be made by using identical reference numerals where possible. Further, reference numerals indicated herein will generally be used to indicate the same elements illustrated diagrammatically in both assemblies in the figures.

In order to form the granita beverage, the beverage apparatus 30 is configured to cool or freeze a beverage solution to a partially frozen state and maintain it at such state to be substantially immediately dispensable by a user when desired. Illustratively, the apparatus 30 is operated by placing a beverage solution in a selected hopper 42 of the hopper assembly 32, positioning a cover assembly 44 on top of the hopper 42 and activating the apparatus 30. As an illustrative example, activation of the apparatus 30 will result in rotation of the auger assembly 38 within the hopper 42 and initiation of a cooling cycle. Cooling is provided by the heating and chilling assembly 40 to reduce the temperature of the beverage solution to freeze or otherwise form ice crystals from the beverage solution, thereby creating a slushy mixture. As an external surface 46 of the heating and chilling assembly 40 begins to cool, a process described below, the temperature of the beverage solution is decreased. The auger 38 revolves to mix the beverage solution within the hopper 42. The auger assembly 38 includes a helically configured blade that is positioned in close proximity to the external surface 46 of the heating and chilling assembly 40. As the beverage solution is cooled, ice crystals form in the solution. As the ice crystals form, generally on or near the surface 46 of the heating and chilling assembly 40, the auger assembly 38 removes these crystals from the surface 46. When a desired beverage consistency is attained, beverage may be dispensed through a dispensing nozzle 48 into a container 50 positioned therebelow.

Figure 5:
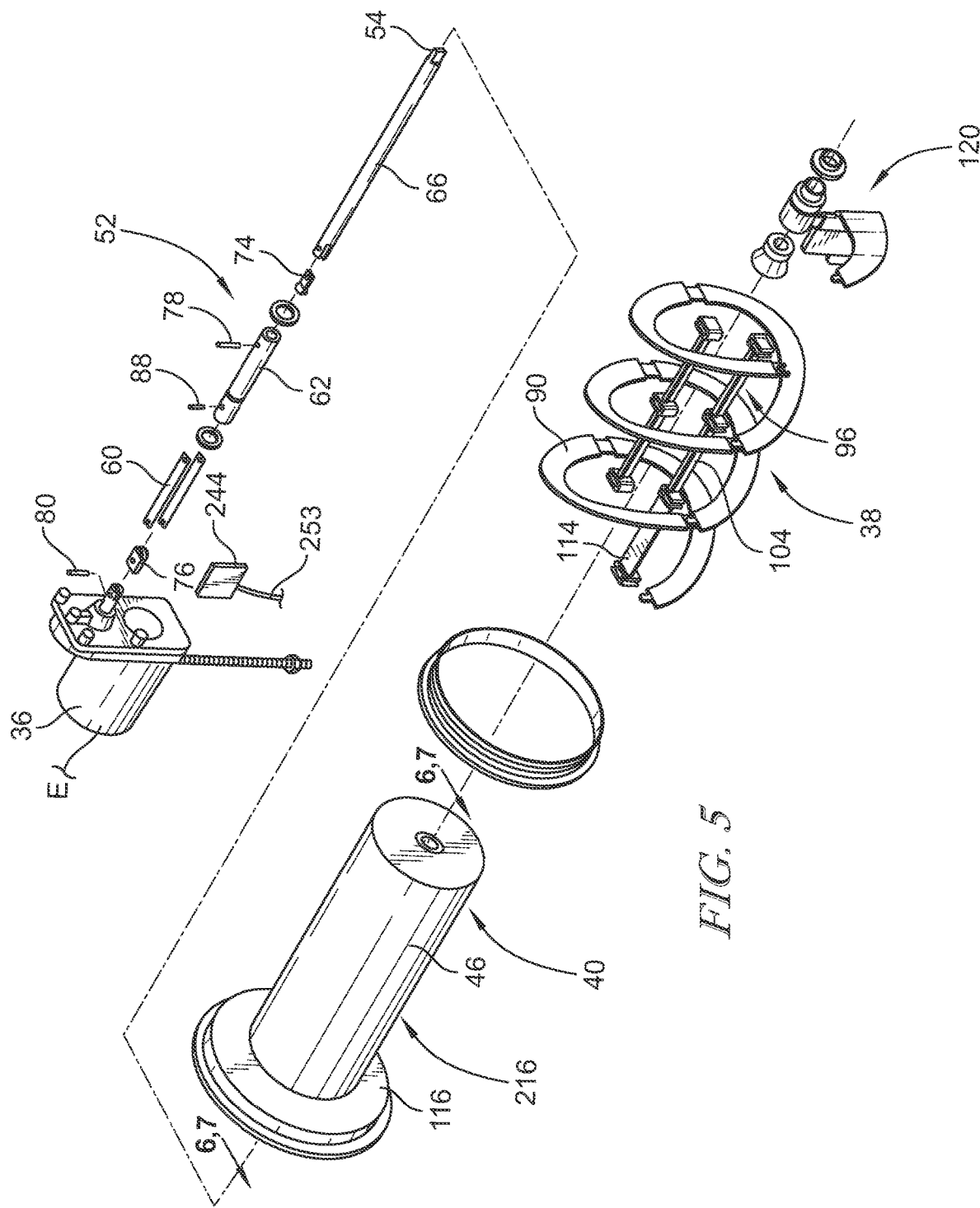
FIG. 5 is an exploded, perspective view of an auger assembly, temperature assembly, and motor shaft assembly of the present invention.
Figure 6:
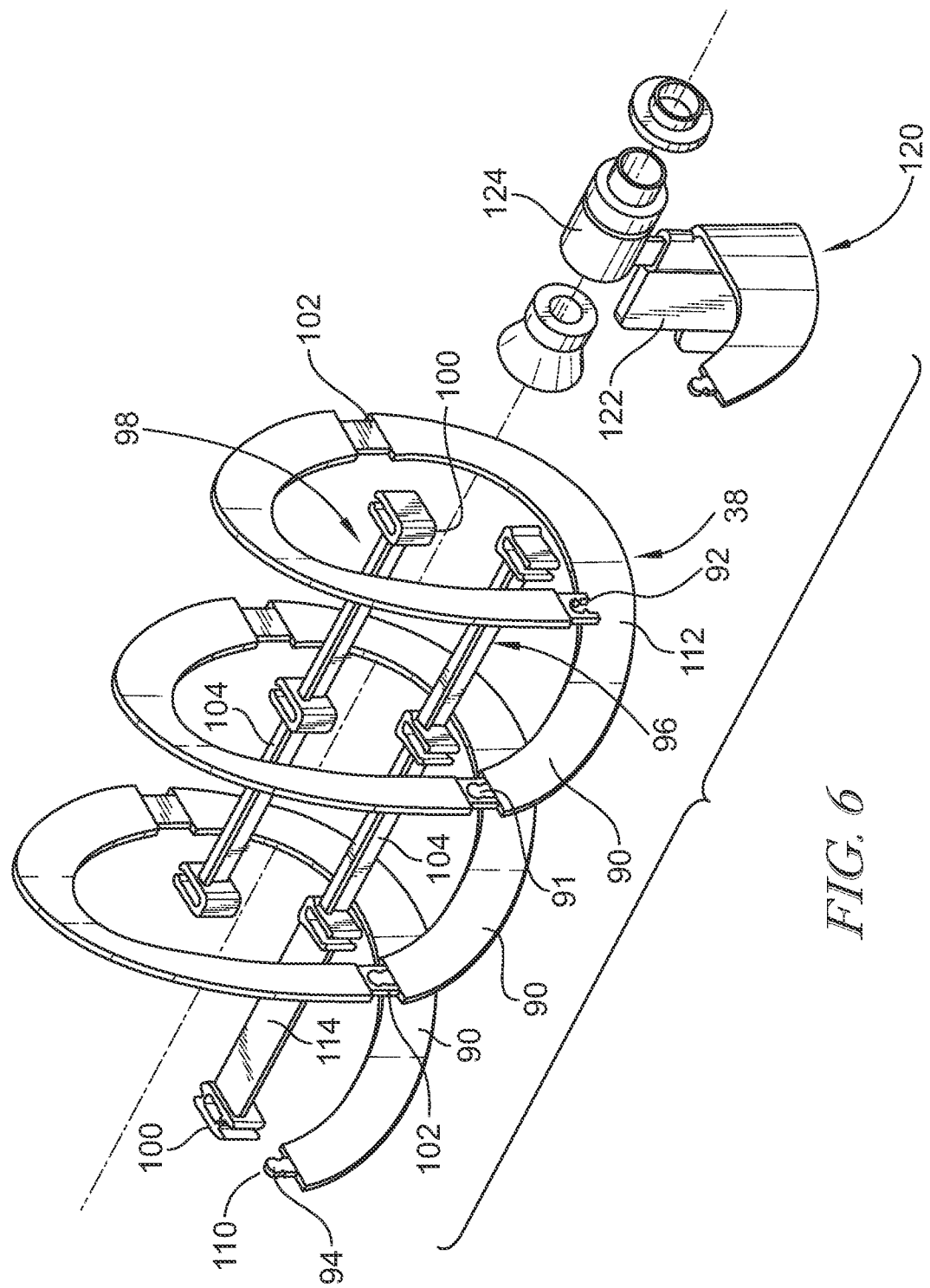
FIG. 6 is a front perspective view of an auger nose component.

Illustratively and as suggested in FIG. 5, the auger assembly 38 is driven by the drive motor 36 and the motor shaft assembly 52. In further illustrative embodiments, the auger assembly 38 as shown includes three interconnected auger sections 90, although other forms of the auger assembly are envisioned herein. One of the auger sections 90 is shown in FIG. 6. Three identical auger sections 90 are connected by interlocking structures 91 on opposite ends thereof.

As shown in FIG. 6, an interlocking recess 92 is provided on one end of the auger section 90 while an interlocking protrusion 94 is provided on the opposite end of the auger section 90. By connecting the interlocking portions 92, 94, the auger sections 90 can be coupled to create the larger continuous helical blade of the auger assembly 38.

In illustrative embodiments, these auger sections 90 are retained in engagement by auger latch bars 96, 98 that have clips 100 for engagement with necked areas 102 on the auger sections 90. The clips are attached to and spaced apart by cross members 104, as illustrated in FIGS. 5 and 6. The clips 100 are configured with a reduced dimension mouth 106 to provide snap-fit engagement over the necked areas 102. The necked areas 102 are also provided in the area where the interlocking structures 92, 94 are mated. As such, the clips 100 also assure that the interlocking structures 91 will not become disengaged during rotation of the auger 38. The cross members 104 also provide desired spacing between the sections 90 to prevent shifting of the auger sections 90 during rotation. It should be noted that the auger latch bar 96 includes four clips that attach to a first 110 and a second 112 terminal end of the three attached auger sections 90. A cross member 114 positioned near the first terminal end 110 is oriented generally perpendicular to the other cross members 104. The perpendicular cross member 114 provides a driving action on the beverage solution positioned towards a base 116 of the heating and chilling assembly 40.

Figure 4:
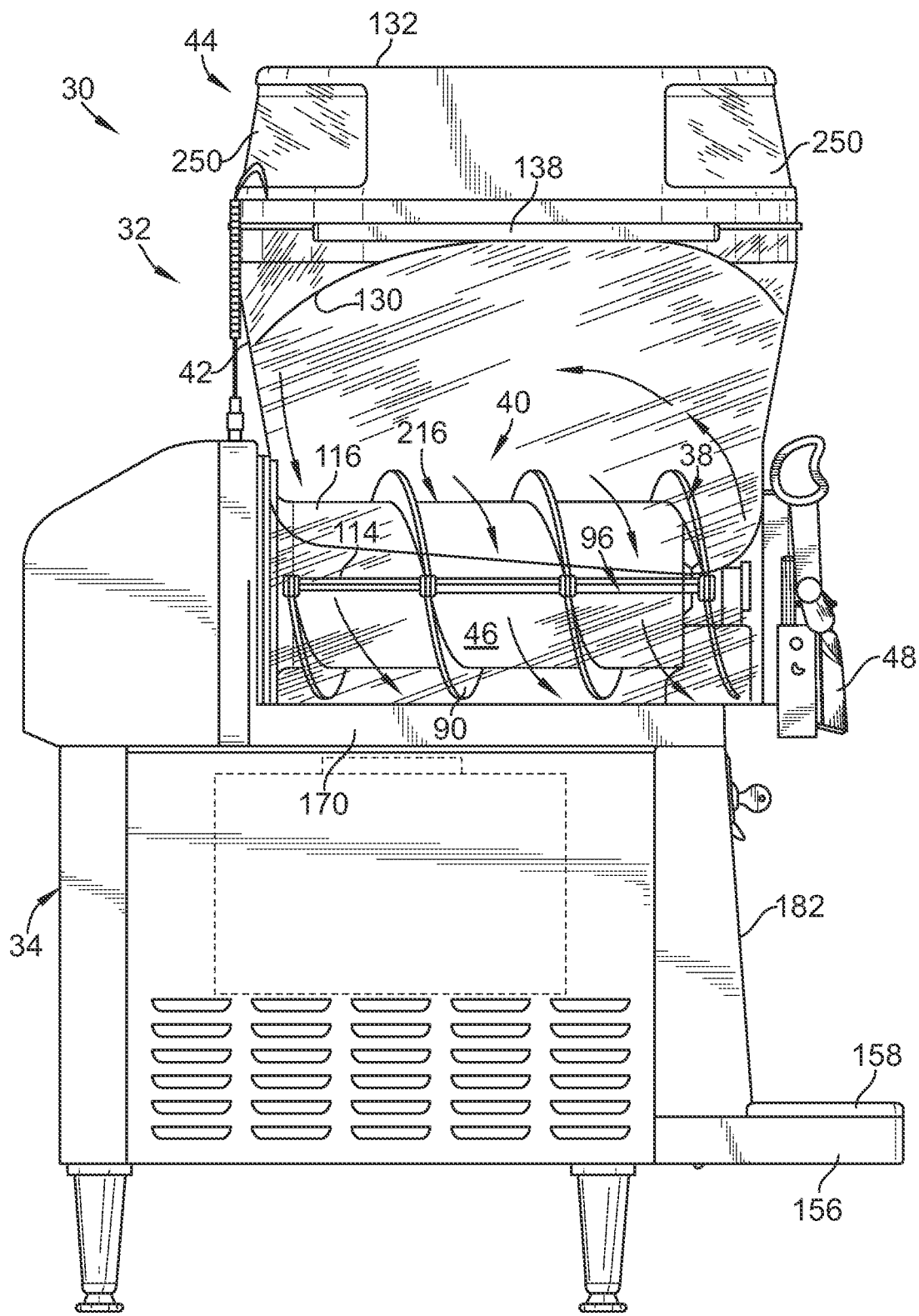
FIG. 4 is an enlarged left-side, elevational view of the apparatus as shown in FIGS. 1-3.

Illustratively, the second terminal end 112 positioned towards the front of the apparatus 30 includes an auger nose 120 attached thereto. The auger nose 120 includes a sweeping blade 122. A cap end 124 of the auger nose 120 attaches to the distal end 54 of the motor shaft assembly 52. As such, connection of the cap end 124 to the motor shaft assembly 52 results in rotation of the auger assembly 38. Generally, driving forces are transferred from the motor shaft 52 to the auger nose 120. The series of auger sections 90 attached to the auger nose 120 are pulled or rotated around the outside 46 of the heating and chilling assembly 40. This driving and sweeping action pull the beverage mixture from the rear of the hopper 42 towards the front of the hopper 42. Mixture that is pulled from the rear of the hopper 42 is pulled downwardly into the auger path and mixture that is pushed from the front of the hopper 42 is pushed upwardly over the auger 38. As the result of pulling and pushing of the beverage mixture, a churning hump 130 (see, FIG. 4) tends to form in a middle portion of the hopper 42. Additionally, the auger 38 may run at a single speed or may be variable speed depending on control input.

A control panel drawer 180 may be illustratively provided in the front panel 182 of the housing 34. Illustratively, the control panel drawer 180 includes a drawer frame 184 in which is retained a control panel 186 and control devices 188. The control panel drawer 180 allows the controls to be completely removed from the serving area, thus avoiding splashing or the accumulation of beverage substance thereon. It is particularly helpful when considering that many of the beverage substances include sugar components and therefore can be quite sticky and easily damage electrical control devices. Additionally, the orientation of the control devices 188 on the control panel 186 within the drawer 184 allow the control devices 188 to be sufficiently large to facilitate ease of use of the controls. Additionally, a lock device 190 is provided on the drawer 184 in order to prevent unauthorized access to the controls. A drawer stop 192 is provided on a bottom portion of the drawer 180 to allow the drawer 180 to be fully extracted from the housing 34 while retaining it in engagement therewith.

Figure 7:
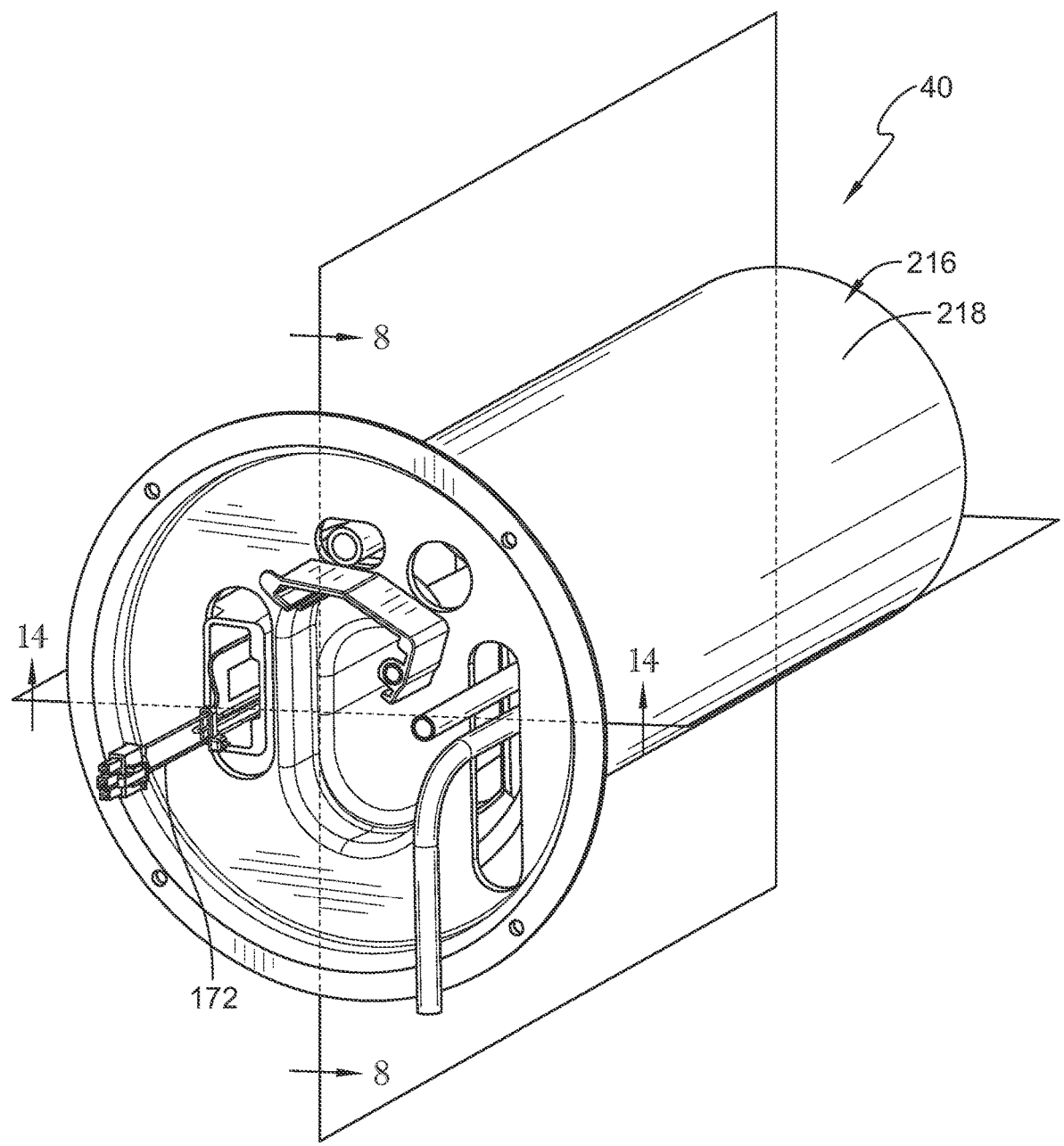
FIG. 7 is a top, front, left-hand perspective view of a temperature control drum.
Figure 8:
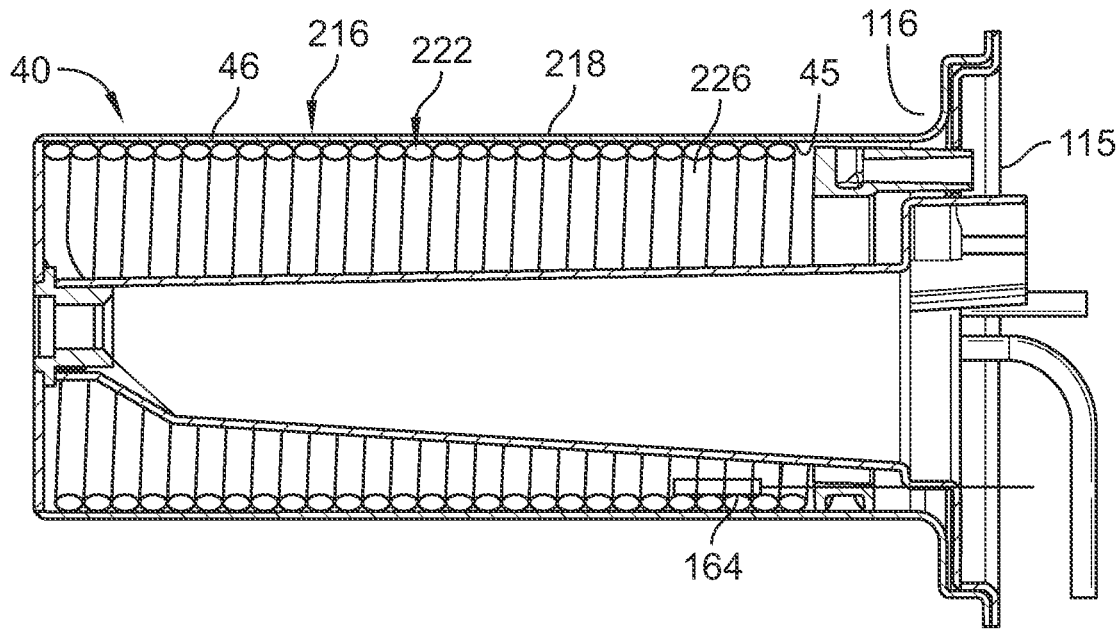
FIG. 8 is a partial fragmentary, cross-sectional, side elevational view of the temperature assembly taken along plane 8-8 in FIG. 7 showing a refrigeration coil.
Figure 9:
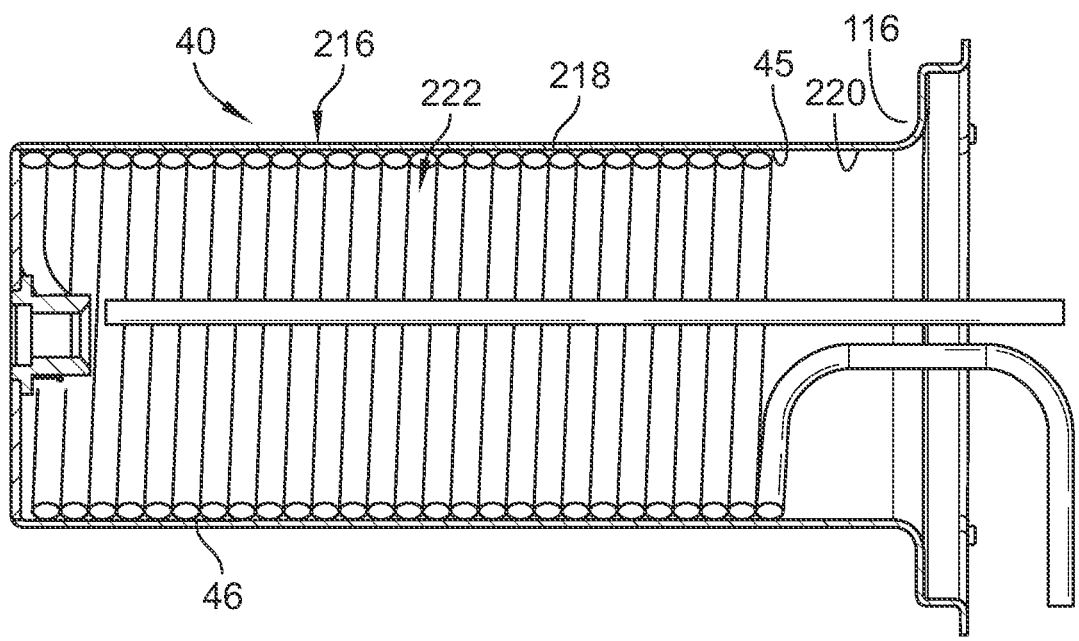
FIG. 9 is a partial fragmentary, cross-sectional, side elevational view taken along line 8-8 in FIG. 7 in which the insulation and inner drum has been removed from the cavity of the temperature control drum to better show the configuration of the refrigeration coil contained therein.
Figure 10:
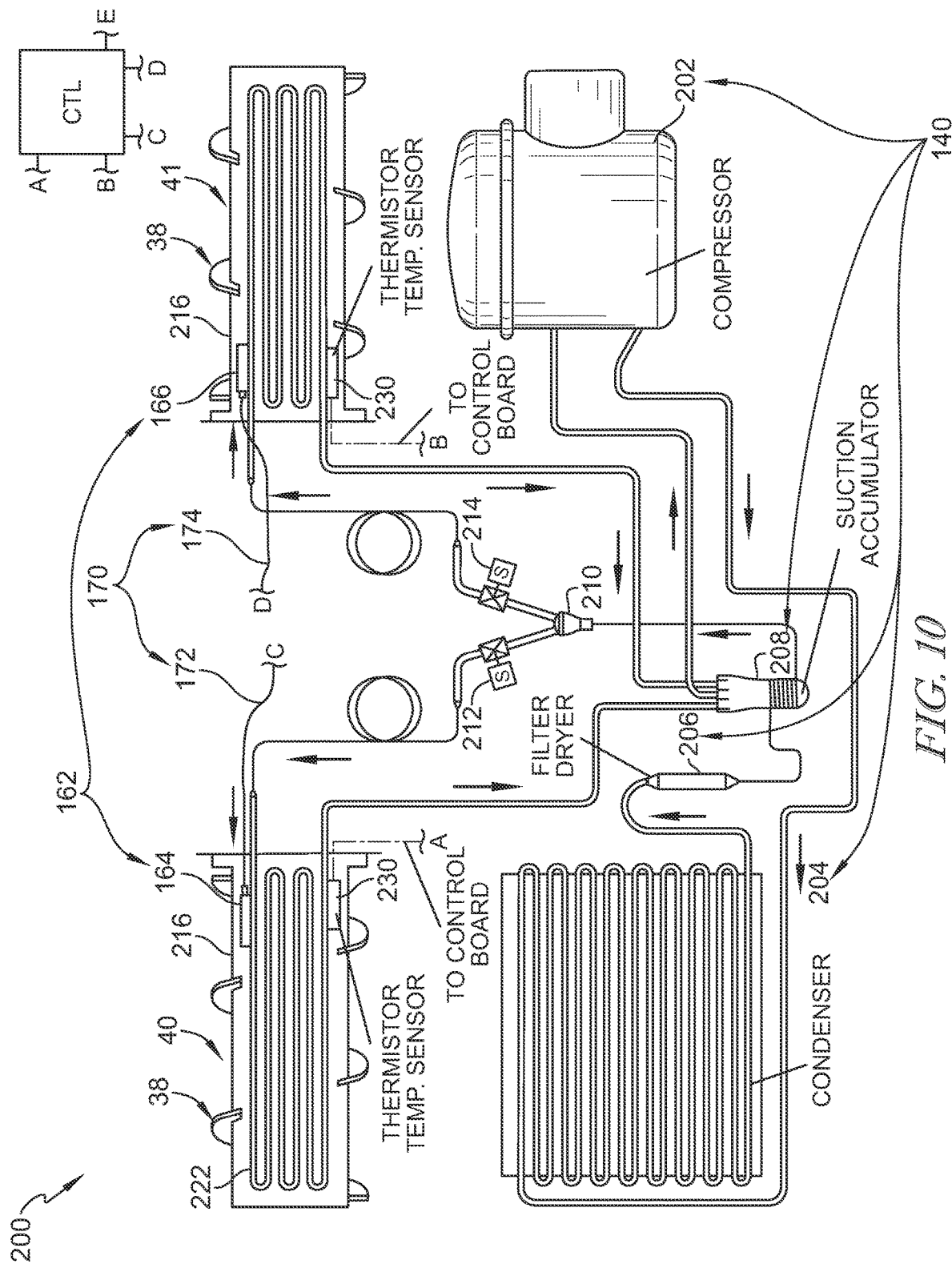
FIG. 10 is a diagrammatic illustration of a temperature control system employed in the present invention.

Turning now to FIGS. 7-10, the temperature control system 200 of the present invention is shown diagrammatically in FIG. 10 while specific structures of the temperature control system 200 are shown in FIGS. 7-9. The temperature control system 200 includes a coolant system 140 and a heating system 160. The temperature control system 200 is configured to chill the beverage solution to a partially-frozen state to form ice crystals therein, and also to warm or heat the partially-frozen beverage product to melt ice crystals therein and return the beverage to a liquid or solution state. As mentioned, the ability to return the beverage product to a thawed/liquid state periodically provides improvement and consistency in the quality of the granita product overtime. If the mixture were to be maintained in a frozen condition continuously without ever going back to a liquid solution, the flavor solids in the mixture would tend to migrate to the outside of the crystals retained in the slush. In other words, each crystal tends to initially form with the flavor solids mixed throughout. As the mixture is maintained in a slush state over a long period of time, the solids tend to migrate from the center of the crystal to the outside. This decreases the desired characteristics of the flavor and reduces consistency in the beverage.

Illustratively, in FIG. 10, the coolant system 140 includes a compressor 202, a condenser 204, a filter dryer 206 and a suction accumulator 208. As shown in FIG. 10, the coolant system 140 of the temperature control system 200 provides coolant distribution to a pair of temperature assemblies 40, 41. Coolant may be distributed to both or only one of the temperature assemblies 40, 41, depending on whether both or only one of the hoppers in the apparatus 30 are desired to be operational. For instance, in certain situations, it may be desirable to have one hopper in use and containing partially frozen granita product for immediate dispensing, while the other hopper may be shut down for maintenance or for letting the granita product thaw to allow the solution to return to a liquid state to maintain the quality of the granita product produced, as discussed herein. Selective control of coolant to the temperature assemblies 40, 41 may be achieved by using a splitter 210 and a pair of controllable solenoid valves 212, 214.

FIG. 10 further illustrates the control system which controls the heating and cooling operations. Each drum 40 and 41 has a PTC heater 164 and 166. Each drum 40 and 41 further has a temperature sensor 230. The temperature sensor may be a thermistor, resistance temperature detector, or thermocouple. The temperature sensor 230 in each drum 40 and 41 is connected via a wiring lead A and B to a control system CTL. Each PTC heater 164 and 166 is further connected to the control system CTL via two additional wiring leads C and D. Referring back to FIG. 5, the motor 36 which drives the auger 38 is connected to the control system CTL via an additional wiring lead E. The control system CTL controls the cooling operation by first providing a cooling system and controllably cooling the beverage solution to form an at least partially frozen beverage solution while simultaneously detecting the temperature of the beverage solution and adjusting the temperature of the cooling system in response. The control system further, while detecting and adjusting the temperature of the cooling system, actuates the auger in both forward and reverse directions to ensure the beverage solution is homogenously mixed during the cooling operation.

The control system CTL also controls the heating operation by first providing a heating system and controllably heating the at least partially frozen product for a second time period to form a generally liquid product. The control system CTL then detects the temperature of the thawed product and determines when the thawed product has reached a predetermined thawed condition, and maintains this thawed condition by actuating the heating elements 164 and 166 while simultaneously detecting the temperature for a period of time before the control system CTL restarts the cooling operation. The control system further, while detecting and adjusting the temperature of the heating system, actuates the auger in both forward and reverse directions to ensure the beverage solution is homogenously mixed during the heating operation.

The cooling operation of the heating and chilling assembly or temperature assembly 40 is configured to remove heat from the beverage solution in the hopper of the assembly, thereby causing portions of the beverage solution to freeze or form ice crystals within the product to form the desired slushie temperature and consistency. With further reference to FIGS. 7-9, the heating and chilling assembly 40 includes a temperature drum 216 having a wall 218 and defining a cavity 220 therein. The assembly 40 illustratively includes a cap 115 positioned over an opening into the cavity 220. The temperature drum 216 is formed of a thermally conductive material to help transfer heat to and from the mixture that surrounds the outside surface 46 of the drum 216.

Illustratively, the heating system 160 includes a heating assembly 162 and a wiring assembly 170. The heating assembly 162 further illustratively includes a first heating apparatus 164 and a second heating apparatus 166. As shown in FIG. 10, the first heating apparatus 164 of the temperature control system 200 is secured within the temperature assembly 40 and provides heat distribution to the temperature assembly 40, and the second heating apparatus 166 of the temperature control system 200 is secured within the temperature assembly 41 and provides heat distribution to the temperature assembly 41. The wiring assembly 170 includes a first wiring 172 coupled to the first heating apparatus 164 and a second wiring 174 coupled to the second heating apparatus 166 to provide electrical control and operation of the heating assembly 162. Accordingly, the first and second heating apparatuses 164 and 166 can be independently controlled and operated to apply heat distribution to the temperature assemblies 40 and 41, respectively. Such independent control permits one assembly 40 to be heated, thereby thawing the beverage product in the hopper of the assembly 40, while the other assembly 41 is maintained in a chilling operation to keep the beverage product in the hopper of assembly 41 in a chilled state for dispensing to a user essentially on demand.

For the cooling operation, the drum 16 is illustratively configured to transfer heat from the mixture to a refrigeration coil 222 retained in the cavity 220. The coil 222 is sized and dimensioned to snugly fit against the inside surface of the wall 218 to facilitate heat transfer from the beverage solution to the refrigeration or coolant medium flowing through the coil 222. In illustrative embodiments, epoxy 224 is applied to the coil 222 to fill the spaces between neighboring portions of the coil 222. The epoxy 224 is chosen for its thermally conductive characteristics so as to further increase the thermal conductivity between the drum 216, the coil 222 and the coolant medium flowing through the coil 222. Generally, the epoxy 224 is applied to the outside of the coil 222 and to the inside surface of the drum 216 before inserting the coil 222 into the cavity 220 of the drum 216. The epoxy 224 is applied to fill the small voids between the curved surfaces of the coil 222 thereby facilitating increased heat transfer therethrough and minimizing thermal losses. With reference to FIG. 8, insulation material 226 is provided internally of the coil 222 to insulate the area between the coil 222 and the hollow bore 56 through which the shaft assembly 52 is positioned. As indicated in FIG. 10, the auger 38 moves relative to the fixed drum 216 so as to spread and move beverage mixture along the outside surface 46 thereby transferring heat from the beverage mixture to the coolant flowing through coil 222.

Conversely, the heating operation of the heating and chilling assembly 40 is configured to introduce heat into the beverage solution in the hopper of the assembly, thereby causing portions of the beverage solution to thaw or melt to become a liquid in order to permit maintenance of the assembly or to allow for the refreezing of the solution once the sugar/syrup of the solution has been redistributed into the product upon thawing in order to increase the consistency of subsequently formed ice crystals after re-freezing occurs. The heating apparatus 164 of the heating assembly 160 will be specifically described herein, but it is understood that heating apparatus 166 may be substantially similar as described for heating apparatus 164.

During the heating operation, the auger 38 direction is reversed such that the auger 38 runs both forward and reverse directions. The reversal of the direction of the auger 38 remixes the beverage solution and ensures an even consistency. The heating apparatus 164 is also located toward back of the drum 216 so reversing and pushing the beverage solution to the back of the drum 216 ensures an even thawing as the beverage solution is cycles near the heating apparatus 164. The auger 38 direction changes during the heating operation by running forward for 5 minutes and then in reverse for about 30 seconds. In some embodiments, the auger 38 runs forward for about 7 minutes and in reverse for about 45 seconds. In other embodiments, the auger 38 runs forward for about 9 minutes and in reverse for about 1 minute.

The auger 38 direction changes during the cooling operation as well. The auger 38 direction changes during the cooling operation by running forward for 30 minutes and then in reverse for about 30 seconds. In some embodiments, the auger 38 runs forward for about 45 minutes and in reverse for about 45 seconds. In other embodiments, the auger 38 runs forward for about 60 minutes and in reverse for about 1 minute.

One additional benefit of the heating operation is that thawing can be achieved at lower liquid levels because of the location of the temperature sensor 230 within the drum 216. The temperature sensor 230 is located lower in the drum 216 to allow for accurate temperature measurements when the liquid level in the apparatus 30 is low. Additionally, there is a modulating algorithm which determines when the beverage solution is fully thawed by first heating the beverage solution, then turning off the heater and allowing the solution to come to steady state. If the steady state temperature of the beverage solution is above the freezing point of the solution and there is no change in the temperature of the beverage solution over a period of time, the solution is deemed to be thawed and the system switches over to the cooling cycle. If the steady state temperature drops sharply after the heater is turned off, the beverage solution still has ice crystals present and the heater is cycled back on. This process is repeated until the steady state temperature of the beverage solution is above the freezing point of the beverage solution and does not change when the heater is cycled off. Once the modulating algorithm determines the beverage solution has been fully thawed, the cooling cycle recommences.

As illustrated in FIGS. 8 and 9, the heating apparatus 164 may be positioned within the cavity 220 of the assembly 40 adjacent or near the outside surface 46 and be configured to introduce heat to the outside surface 46 via the wall 218. As frozen beverage solution is mixed in the hopper, it will begin thawing when it comes into contact with the outside surface 46, thereby causing the ice crystals to melt or become closer to a liquid state. Use of the heating apparatus 164 to increase the temperature of the outside surface 46 permits a faster thawing time for the frozen beverage product than by simply turning off the assembly and letting the product thaw naturally in the ambient air temperature, thereby reducing the amount of downtime for the assembly.

Figure 11:
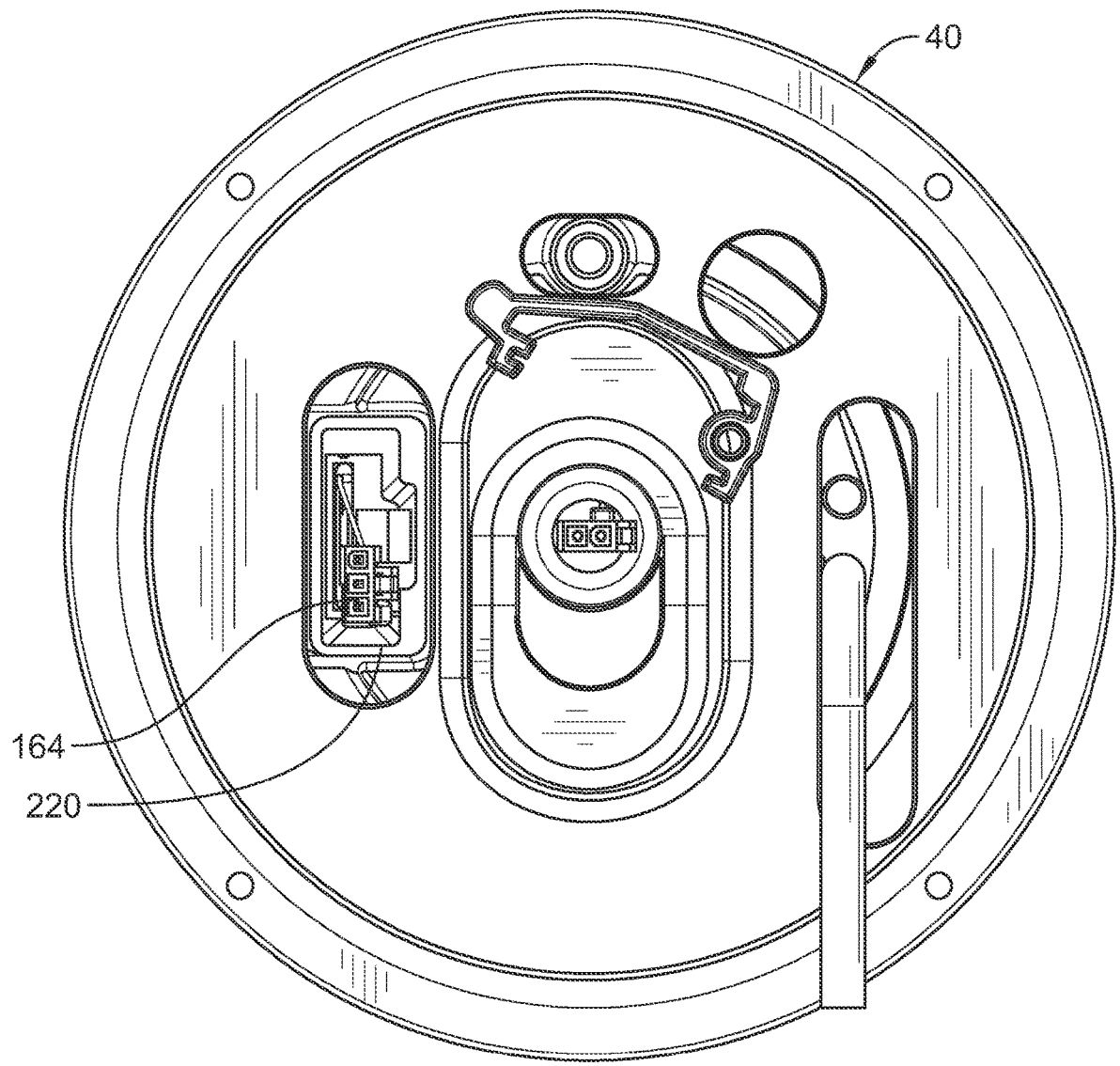
FIG. 11. is a front elevation view of a heating assembly of temperature control drum of FIG. 7.
Figure 12:
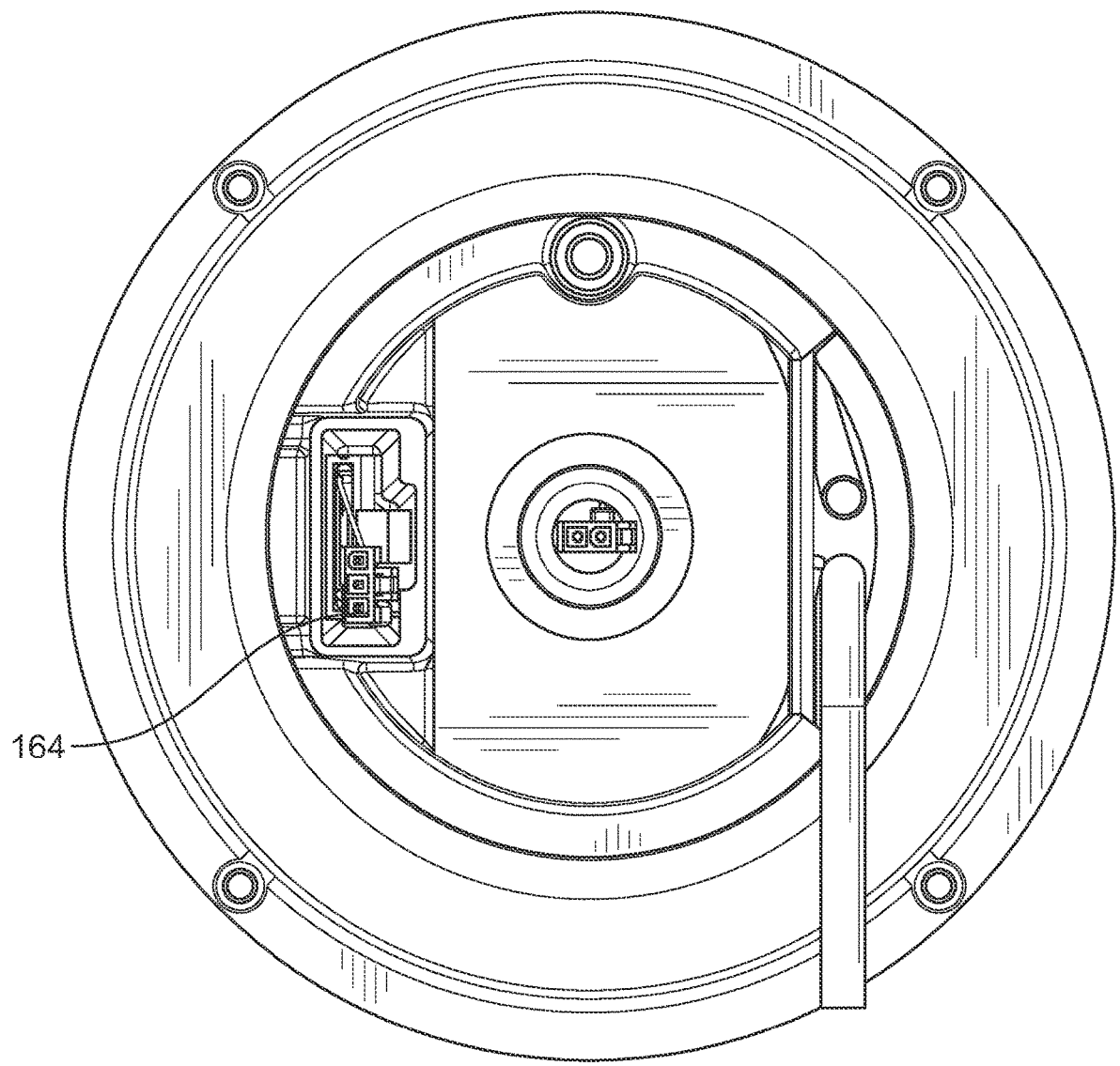
FIG. 12. is a front elevation view of a heating assembly of temperature control drum of FIG. 7 with the inner drum removed.
Figure 13:
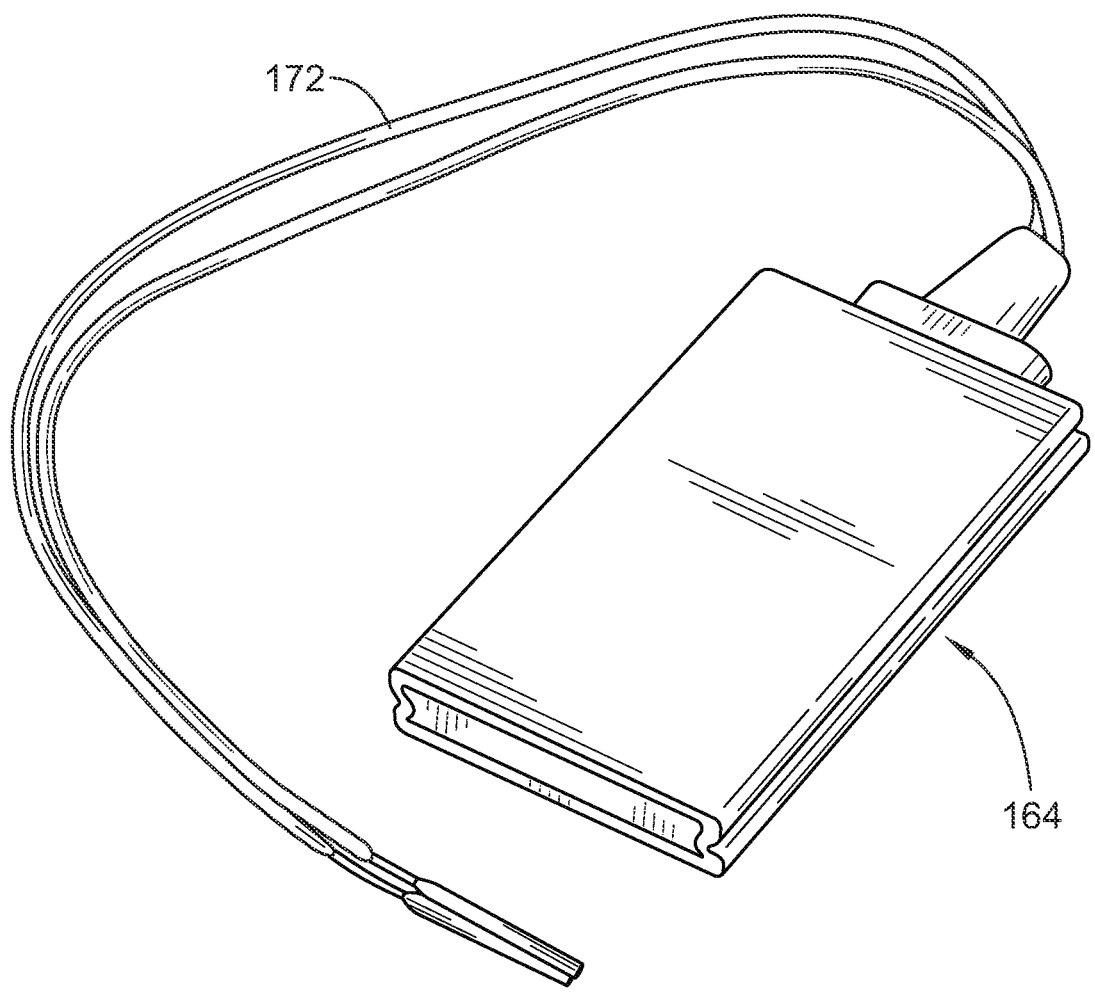
FIG. 13 is a view of the heating assembly removed from the temperature control drum.

In an exemplary embodiment, the heating apparatus 164 may be in the form of a PTC (Positive Temperature Coefficient) heater, as illustrated in FIG. 11, although other types of heaters are envisioned herein such as electric resistive heaters or forced air heaters. As illustrated in FIGS. 11-12, the heating apparatus 164 may be appropriately sized to fit within the cavity 220 of the assembly 40.

Figure 14:
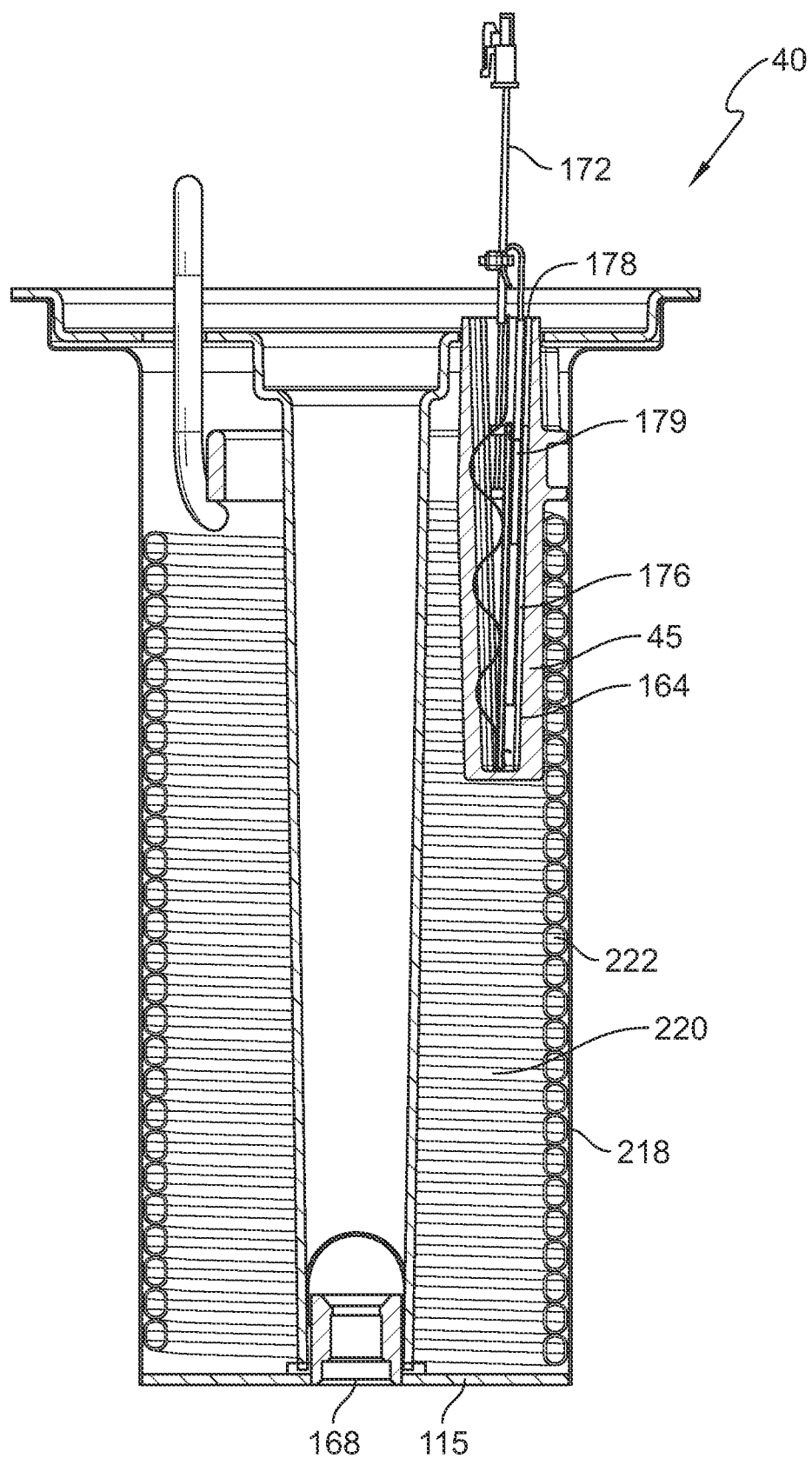
FIG. 14 is a partial fragmentary, cross-sectional, side elevation view of the temperature assembly taken along plane 14-14 in FIG. 7 showing a refrigeration coil and a heater retained within a cavity of a temperature control drum.

As illustrated more precisely in FIGS. 11-14, in certain embodiments, the heating apparatus 164 may be positioned adjacent to the refrigeration coil 222 and coupled thereto as the coil 222 is positioned adjacent the wall 218. The heating apparatus 164 may be held within the cavity by use of a coupling bracket 176 or other similar component. The bracket 176 may be, illustratively, an extruded aluminum component that the heating apparatus 164 may be received within as the bracket is secured to the refrigeration coil 222. In various embodiments, the bracket 176 may be sized appropriately to receive the heating apparatus 164. For instance, if the heating apparatus 164 is a PTC heater as illustrated in FIG. 14, the bracket may be approximately 3 inches wide with an aperture 178 sized to receive the heating apparatus 164 such that walls 179 of the bracket 176 fully surround the heating apparatus 164. However, other embodiments are envisioned herein as well.

The heating apparatus 164, or the bracket 176 configured to secure the heating apparatus 164 within the cavity 220, may be secured to the refrigeration coil 222 or an inside surface 45 of the wall 218 via epoxy 224 similar to the epoxy used to secure the refrigeration coil 222 within the cavity, as such epoxy will also provide advantageous thermal properties for efficiently transferring heat from the heating apparatus 164 to the outer surface 46 of the assembly 40 to thaw the frozen beverage product.

The first wiring 172 of the wiring assembly 170 may be configured to extend away from the heating apparatus 164 toward the cap 115 of the assembly 40. The cap 115 may be positioned to substantially enclose the cavity 220 of the assembly 40 to retain temperature control over the temperature of the cavity 220 during either cooling or heating operations. Accordingly, a second aperture 168 may be formed in the cap 115 to permit the first wiring 172 of the wiring assembly 170 to extend out of the cavity 220 and be electronically connected to a controller to control operation of the heating apparatus 164. As illustrated in FIG. 14, the heating assembly 164 may be fully enclosed in the cavity 220 while the first wiring 172 is configured to extend through the aperture 178. In various embodiments, insulation may be positioned in the cavity 220 or adjacent the aperture 178 to reduce heat transfer to/from the cavity 220 via the aperture 178.

In various embodiments, a thermistor temperature sensor 230 may be provided internally of the heating and chilling assembly 40 to determine the temperature of the beverage solution. The temperature sensor 230 is connected to a control circuit or board (not shown), as illustrated in FIG. 10, which receives the readings from the temperature sensor 230 and can be configured to control the system in light of such readings. In particular, at the end of a cooling cycle, the controller will turn the compressor 202 off and then wait a predetermined time, e.g. 5 seconds. After the predetermined time has elapsed, the controller will activate solenoid valves 212, 214, which are controlled in response to the desired slush stiffness set by the user, for a preselected time period. When no further cooling is needed, the controller turns off the valves 212, 214.

Further, in exemplary embodiments, with regard to the temperature of the beverage, a night control (not shown) may be provided to place the apparatus 30 in a "night" mode. The night control overrides the pre-existing control pre-sets to maintain the beverage at a predetermined temperature point above freezing yet in a chilled condition. The night control effectively overrides the settings of "ice/no-ice" switches (not shown) and places both in the "no-ice" condition. The night control may further allow the mixture to thaw from a slush state to a liquid state. As mentioned previously, this periodic thawing, e.g. during off hours or "night" hours, helps maintain consistent flavor in the mixture. As such, the night control helps maintain consistency and flavor quality throughout service hours. Operators of the machine can select the periodic thawing to occur during optimal off hours to ensure that frozen beverage solution is available to customers during active hours.

Additionally, the night control may be set to maintain the mixture in a chilled state. The chilled state helps to reduce and minimize the start-up time. In other words, for example, if the beverage mixture is maintained at 36° degrees during off hours and the desired slush temperature is 33°, the mixture only needs to be decreased by 3° in order to achieve the desired dispensing temperature. Whereas if the mixture is allowed to completely thaw and rise to room temperature, for example 70°, the temperature would need to be decreased 37° to achieve serving temperature.

While a preferred embodiment of the present invention is shown and described, it is envisioned that those skilled in the art may devise various modifications and equivalents without departing from the spirit and scope of the claims. The invention is not intended to be limited by the foregoing disclosure.

The invention is claimed as follows:

1. A cold drink system comprising:
   at least one beverage hopper having at least one wall defining an interior volume for retaining a quantity of beverage product in solution for chilling to at least a partially frozen condition and dispensing therefrom;
   a closed drum contained within the beverage hopper, the closed drum having a wall defining a cavity therein fluidly separated from the interior volume of the hopper, the closed drum wall having an outside surface configured to contact the beverage solution retained in the interior volume of the beverage hopper;
   an auger configured to move relative to the outside surface of the closed drum to remove at least partially frozen beverage product from the outside surface when the beverage product is chilled; and
   a temperature control assembly, the temperature control assembly including:
   a cooling system for controllably cooling the beverage product to at least a partially frozen condition; and
   a heating system for controllably raising the temperature of the partially frozen beverage product;
   wherein the cooling system and the heating system are retained within the cavity of the closed drum and configured to change the temperature of the outside surface of the closed drum to control the temperature of the beverage product;
   wherein the cooling system includes a refrigeration coil coupled to the inside surface of the wall, and
   wherein the heating system includes a heater retained within the cavity of the closed drum directly coupled to the refrigeration coil.

2. The cold drink system of claim 1, wherein the heating system is an electronic heating system.

3. The cold drink system of claim 1, wherein the heater is selected from the group consisting of an electric resistive heater or a forced air heater.

4. The cold drink system of claim 3, wherein the heater is retained within the cavity of the closed drum via a bracket.

5. The cold drink system of claim 4, wherein the bracket of the heater is thermally coupled to the refrigeration coil.

6. The cold drink system of claim 5, wherein the refrigeration coil is coupled to the inside surface of the wall by a thermally-conductive material.

7. The cold drink system of claim 5, wherein the closed drum further includes a first end cap at a first end of the closed drum that substantially seals off the interior cavity of the closed drum from the quantity of beverage product in solution and a second end cap at a second end of the closed drum including an aperture through which a wiring system of the electronic heating system extends to connect to the heater.

8. The cold drink system of claim 1, wherein the cavity of the closed drum is otherwise substantially filled with an insulating material.

9. The cold drink system of claim 1, wherein the system further comprises:

a second beverage hopper, closed drum, auger, cooling system, and heating system, for retaining a quantity of a second beverage product in solution for chilling and dispensing therefrom.

10. The cold drink system of claim 9, further comprising at least one controller for controlling the operation of the cold drink system, wherein the first and second heating systems can be independently controlled by the at least one controller to raise or lower the temperature of the separate beverage products retained in each of the hoppers, respectively.

11. The cold drink system of claim 9, wherein the first and second beverage hoppers are retained on a single beverage dispensing apparatus.

12. The cold drink system of claim 9, wherein the second heating system is an electronic heating system and is retained near an inside surface of the second closed drum to transfer heat to an annular wall of the closed drum.

13. The cold drink system of claim 9, wherein the cooling system of the temperature control assembly includes a second refrigeration coil coupled to an inside surface of a wall of the second closed drum, and the second heating system is thermally coupled to the second refrigeration coil.

14. The cold drink system of claim 1, wherein the system further includes a temperature sensor for detecting the temperature of the beverage product retained in the hopper.

15. A method of controlling the temperature of a beverage product retained in a beverage hopper of a cold drink system, the method comprising the steps of:
providing a cooling system;
controllably cooling the beverage product to form an at least partially frozen beverage product condition, the cold drink system including a closed drum within an interior volume of the hopper, the cooling system being retained within the closed drum and being configured to controllably transfer heat from the beverage product to controllably form and maintain the at least partially frozen beverage product in the at least partially frozen condition for a first time period; and
providing a heating system;
controllably heating the at least partially frozen product for a second time period to form a generally liquid product, the closed drum of the cold drink system including a heating element of the heating system configured to transfer heat via conduction to cooling system refrigeration coils to thaw the at least partially frozen product,
detecting when the thawed beverage product has reached a predetermined thawed condition, and
maintaining the predetermined thawed condition for a third period of time before cooling the beverage product to form an at least partially frozen product again,
wherein the cooling system includes a refrigeration coil coupled to the inside surface of the wall, and
wherein the heating system includes a heater retained within the cavity of the closed drum directly coupled to the refrigeration coil.

16. The method of claim 15, wherein the step of heating the at least partially frozen product includes providing an electronic heating element.

17. The method of claim 15, wherein the method further comprises the steps of:
providing a second beverage hopper, closed drum, cooling system, and heating system, for retaining a quantity of a second beverage product in solution for chilling and dispensing therefrom;
controllably cooling the second beverage product retained in the second hopper to form a second at least partially frozen product, the second hopper containing the second closed drum, the second cooling system configured to transfer heat from the second beverage product to form and maintain the second at least partially frozen beverage product in an at least partially frozen condition for a first time period; and
controllably heating the second at least partially frozen product for a second time period to form a second generally thawed product, the second closed drum including a second heating system configured to transfer heat to the second partially frozen product to cause the second partially frozen product to thaw,
detecting when the thawed beverage product has reached a predetermined thawed condition, and
maintaining the second thawed beverage mixture in the unfrozen state before cooling the second beverage mixture to form a second partially frozen product again.

18. The method of claim 17, wherein the method further includes providing a controller coupled to the cooling systems and heating systems and configured to control the cooling and heating steps, and wherein the controller can independently control the cooling and heating steps occurring in the first and second hoppers.

19. The method of claim 17, wherein the method further includes only heating one of the first and second at least partially frozen beverage products when the other of the first and second at least partially frozen beverage products remains in the at least partially frozen condition.

20. The method of claim 15, wherein the heating step further includes transferring the heat to an outside surface of the closed drum that is in direct contact with the partially frozen product and the partially frozen product being circulated within the hopper.

21. The cold drink system of claim 6, wherein the thermally-conductive material is a thermally-conductive epoxy.

* * * * *